INVENTOR.
HARVEY H. McCOWEN
HALBERT M. HARRIS, JR.
BY Samuel R. Genca
ATTORNEY

INVENTOR.
HARVEY H. McCOWEN
HALBERT M HARRIS, JR.
BY Samuel R. Genca
ATTORNEY

United States Patent Office 3,474,429
Patented Oct. 21, 1969

3,474,429

METHOD OF WRITING AND READING DATA PULSES FROM A TAPE DRIVEN BY A STEP TAPE TRANSPORT

Harvey H. McCowen, Rochester, and Halbert M. Harris, Jr., Webster, N.Y., assignors to General Dynamics Corporation, a corporation of Delaware Filed July 30, 1965, Ser. No. 476,030
Int. Cl. G11b 5/78
U.S. Cl. 340—174.1 5 Claims

ABSTRACT OF THE DISCLOSURE

A method of recording and reading pulses with a step tape transport subject to erratic movements when stepped is described. Clock pulses are first pre-recorded along a timing track at slow stepping speed. Data pulses are then recorded at high stepping speed through AND gates enabled by the pre-recorded clock pulses from the timing track. The pre-recorded clock pulses are also used to strobe the read-out.

Figure 1:
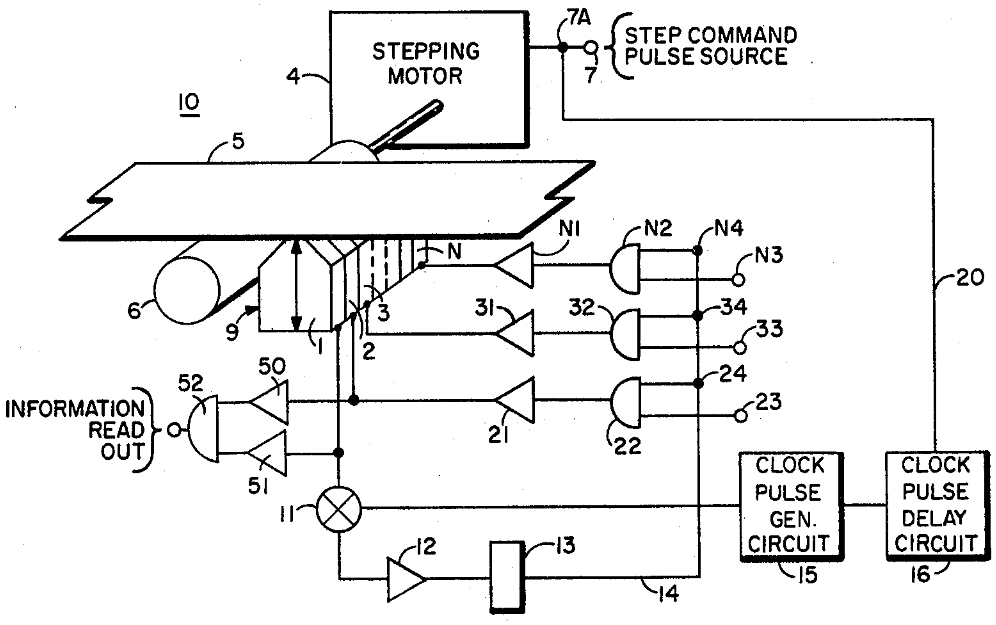

The present invention relates generally to data storage and processing equipment and particularly to a new method or use of such equipment. The method is especially suitable for transferring digital information into and out of an interim signal storage medium, such as magnetic tape which is driven incrementally in a stepwise manner, at a relatively high rate of stepping speed.

It is well known that recordation of information upon a magnetically susceptible tape provides an efficient means of storing information. In the past, computers have included tape driving apparatus which have been capable of receiving information in blocks as it issues from the computer at a high rate of speed; the tape starting and stopping between blocks. It was essential that the tape be quickly accelerated to a desired recording or reading speed from its inoperative or rest state, when information is available for recording or reading and be decelerated equally rapidly at the end of the block.

In the most recent past, it has been found that incremental tape transport systems having incremental stepping motors or stepping drives have worked more satisfactorily for the recording and reading of individual bits of information on the tape than continuous recording and stopping between blocks as in the past. The incremental tape transport system steps or indexes the tape in response to a command signal to quickly accelerate the tape to a desired recording or reading speed from its inoperative or rest state for a given increment of tape travel during which a bit of information such as a pulse may be feed into or out of the tape. Each increment of tape travel is uniform and substantially equal. High information density and utilization of the tape and computer are achieved, since the tape is transported or accelerated only when information is to be recorded or read.

One of the major problems of incremental recording of information on the tape is that the speed of recording or reading digital information is generally limited by the natural resonant frequency of the incremental tape transport system. The position accuracy of the recorded bit of information, such as a digital character or pulse on the tape relative to a rest or inoperative position of the tape at high stepping speeds, is not only dependent upon the incremental movement of the tape effected by the incremental tape transport system, but also is affected by the erratic movement of the tape caused by the natural frequency of the incremental tape transport system. At high stepping speeds, that is, above the natural resonance of the incremental tape transport system, the movement of the tape between any two rest positions is not consistent, even though the incremental tape transport system steps the tape a given amount each time. That is, although the tape is moved a given amount each time, this does not insure that the recorded information will be uniformly disposed from one step to the next step of the tape. Information bits recorded during each step along the same track on the tape may overlap and distort an adjacent recorded information bit, or in some cases, information bits may be lost.

Accordingly, it is an object of the present invention to provide an improved method of recording and reading information on an interim signal storage medium.

It is another object of the present invention to provide an improved method for recording signals on a magnetic tape in an incremental tape transport system.

It is still another object of the present invention to provide an improved method of consistently recording information at an optimum point between each step of the tape where optimum magnetic recording and reading of the information on the tape is achieved.

It is still another object of the present invention to provide an improved method of recording information on magnetic tape while it is driven by an incremental tape transport system, where the tape is driven at higher speeds than those used in the past.

The above and other objects of the present invention are accomplished by the practice in accordance with the invention of an improved method of recording on magnetic tape in an incremental tape transport system which includes means for high speed stepping of the tape during reading or recording.

The method includes the steps of first preparing the tape by recording clock pulses on the tape along a timing track on the tape while the tape is driven at a relatively slow stepping speed where resonant effects of the incremental tape transport system are minimal, and then running the tape through the incremental tape transport system again and synchronizing recording on the tape on at least one other track at a higher stepping speed with the pre-recorded clock pulses. Synchronized recording may be accomplished by enabling a write amplifier with the pre-recorded clock pulses to record on the tape during an instant of time which optimum recording may be achieved during each stepping cycle, even though the tape movement may be erratic at the higher stepping rates.

Read-out may be accomplished at a high continuous playback speed, or at stepwise running speed, synchronized by the clock pulses if desired.

Figure 2:
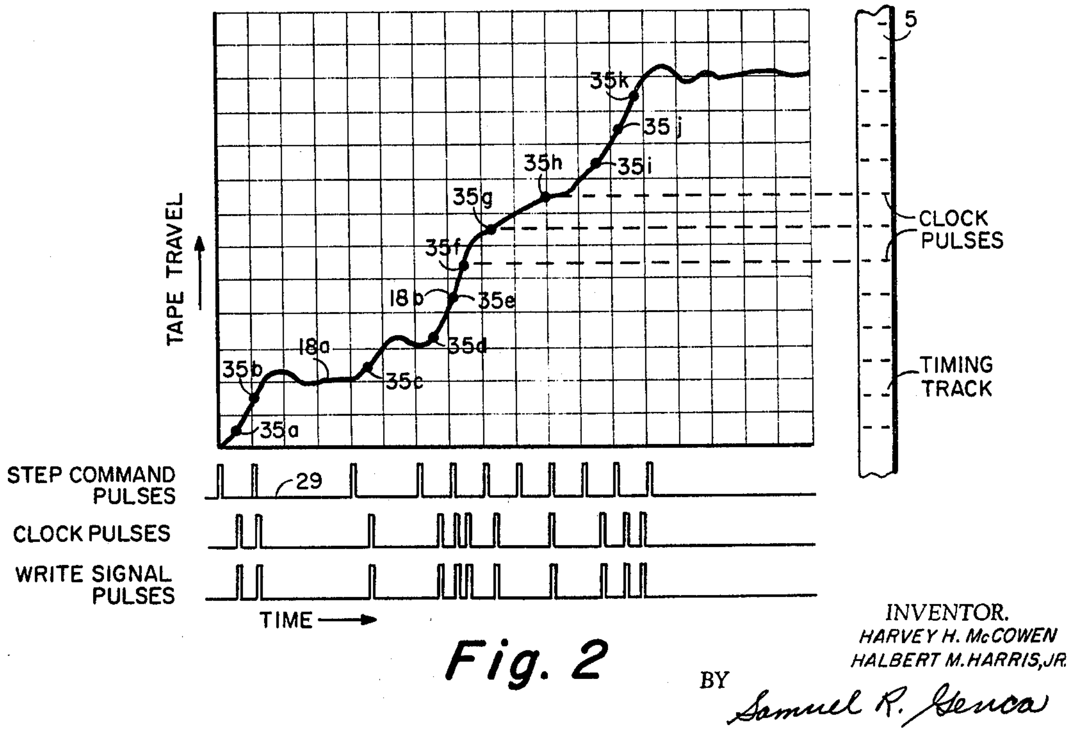
Figure 3:
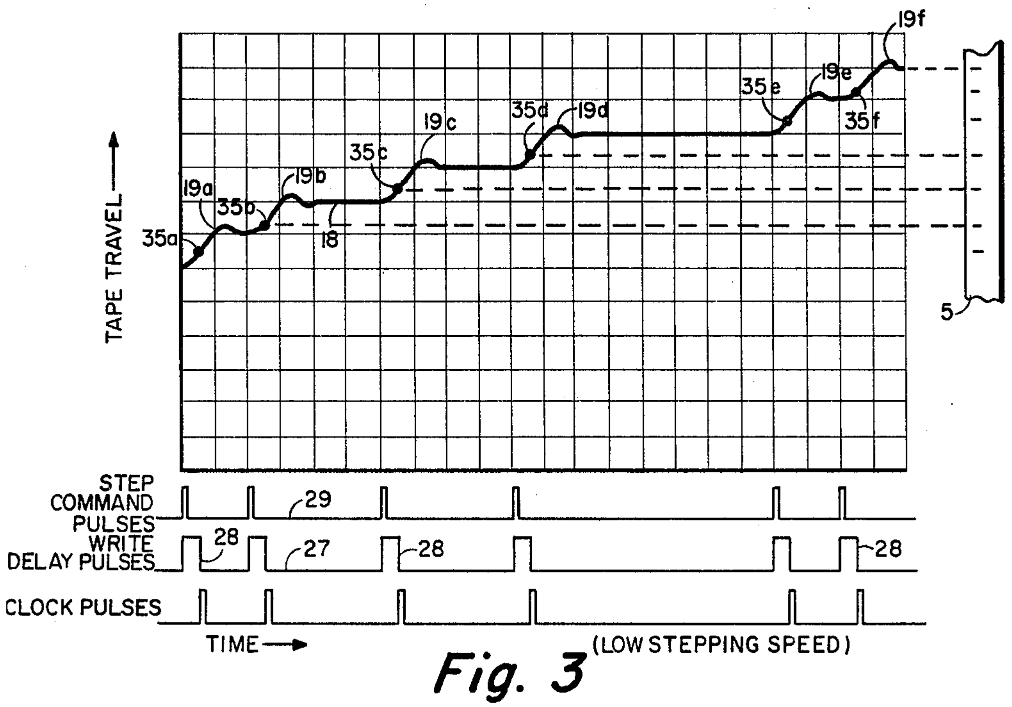
Figure 4:
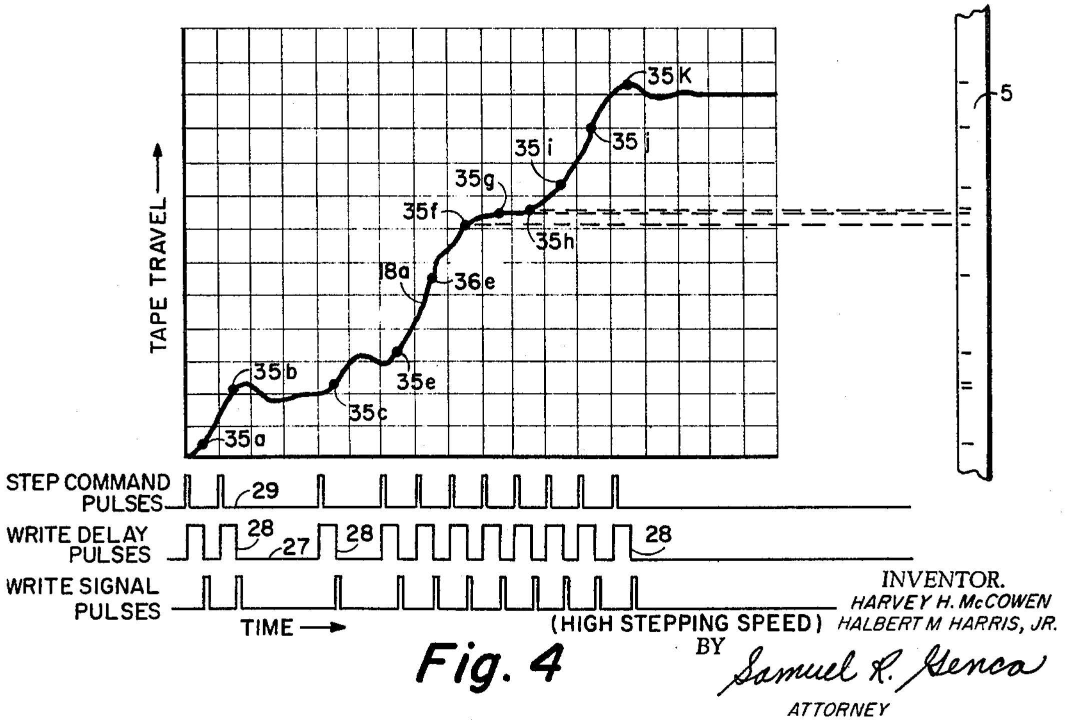

The invention itself, as well as additional objects and advantages thereof, will become more readily apparent from a reading of the following description in connection with the accompanying drawings in which:

FIG. 1 is a diagrammatic illustration of an incremental tape transport system which may be utilized in accordance with the invention; and FIGS. 2 through 4, inclusive, are charts showing the motion of the tape during increments of tape travel and illustrating resonance effects on the tape; corresponding portions of the tape and signals which result during operation are also shown.

Referring to FIG. 1, an interim signal storage medium such as magnetically susceptible tape 5 is shown movable in a step-by-step manner over a multitrack read/write magnetic head 9, by an incremental tape transport system or apparatus 10. The tape 5 is moved incrementally each time a step command pulse is applied from a step command pulse source to an input terminal 7 of a stepping motor 4. The incremental tape transport apparatus 10 includes a tape drive capstan 6, coupled to the tape 5 and the stepping motor 4, for driving the tape 5.

The multitrack read/write head 9 has individual read/write units 1, 2, 3 through N, where N is any number of units for reading or writing information pulses on a corresponding plurality of recording tracks on the tape 5. Each of the read/write units, 1 through N, is connected to a corresponding logic network for writing information bits, which are represented by pulses, on each track of the tape 5. Read/write unit 2 is connected to a logic network, including a write amplifier 21, and an AND gate 22 output connected to the write amplifier 21. The AND gate 22 includes input terminals 23 and 24 for applying a signal pulse to unit 2 and thereby to the tape 5, when signal pulses are coincidently applied to each of the input terminals 23 and 24. One of the signal pulses may be a clock pulse. Read/write unit 3 is connected to another logic network including a write amplifier 31 and an AND gate 32. The AND gate 32 includes terminals 33 and 34. Read/write recording unit N is also connected to a logic network including a write amplifier N1 and an AND gate N2 having terminals N3 and N4. All the AND gates 32 through N2 are similar to AND gate 22 and operate in the same manner, that is, they effect write in when a signal pulse and a clock pulse are applied to their input terminals.

Magnetic read/write unit 1 may be employed in accordance with the invention for recording clock pulses along a corresponding track on the tape 5, which track functions as the timing track (shown along the right hand edge of the tape in FIG. 2). The clock pulses are applied to the unit 1, through a switch 11, from a clock pulse generator circuit 15 and a clock pulse delay circuit 16, both of which may be one shot multivibrators. The clock pulse generator circuit 15 is triggered into operation by the lagging edge of the pulse provided by the clock pulse delay circuit 16 which was previously triggered by the leading edge of a step command pulse from the step command pulse source. These pulses are shown in FIGS. 3 and 4 and are identified as the step command pulses (output of the step command pulse source); the write delay pulses (output of the delay circuit 16); and the clock pulses (output of the generator 15). The clock pulse delay circuit 16 is connected to terminal 7 and to the source of step command pulses by way of lead 20 connected at a junction 7A. The clock pulse delay circuit 16 delays the triggering of the clock pulse generator circuit 15 by a given time increment after receipt of a step command pulse, so that the tape 5 has achieved an optimum recording speed during each step. As will be mentioned hereinafter, this delay depends upon the mechanical characteristics of the tape drive mechanism (viz the time required for the tape 5 to reach constant speed when driven at a given low speed). The clock pulses or timing pulses are recorded on the tape 5 at a relatively low stepping speed, as will be described hereinafter in accordance with the invention.

The tape 5 is first prepared by recording clock pulses on the tape 5. The clock pulses are one of the two pulses which are used to enable AND gates 22 and 32 through N2 and the corresponding write amplifiers 21 and 31 through N1. The switch 11 may be switched to include another logic network including a write amplifier 12 and a one shot multivibrator 13 in series with the read/write unit 1 and input terminals 24 through input terminal N4. Each clock pulse which is read by the read/write head 1 is applied to terminals 24 through N4 by way of a conductor 14 and triggers the one shot multivibrator 13. The pulse generated by the one shot multivibrator 13 enables the AND gates 22 through N2. Each signal pulse which is applied to input terminals 23 through N3 coincidently with the multivibrator pulse, are gated out to the write amplifiers 21 through N1. These signal pulses are recorded on the various tracks of the tape 5.

The stepping motor 4 may be operated at various stepping speeds, including a very low speed (FIG. 3) where resonant effects of the incremental tape transport system 10 on the tape 5 are minimal. For example, the stepping motor 4 may slowly step the tape 5 in response to a step command pulse such that if a chart (not shown) were plotted on the movement of the tape 5 against time, it would appear that the tape would move in equal square steps without appreciable erratic movement. As the speed of the stepping motor 4 is increased, the resonant effect of the incremental tape transport apparatus 10 becomes considerably more noticeable, as shown in FIGS. 2 and 4.

In FIG. 3, a line 18 illustrates a relatively slow movement of the tape 5 graphically during each step of travel effected by the stepping motor 4 in response to a step command pulse. Each step taken by the tape 5 is accompanied by a slight erratic movement as shown by a slight overstep (**19*a*, 19*b*, 19*c*, 19*d*, 19*e* and 19*f*). The slight oversteps 19*a* through 19*f*, illustrate the resonant effects of the incremental tape transport apparatus 10 during each increment of tape travel. The resonant effects shown by the line 18 in FIG. 3 may be considered as being somewhat insignificant or minimal, since recordings may be made at this speed, such that each recorded signal pulse or bit will be evenly spaced from the next or adjacent signal pulse on the tape 5. When the speed of the stepping motor 4 in increased, however, the resonant effects become more pronounced, as shown by a line 18*a* in FIGS. 2 and 4. Line 18*a* in FIGS. 2 and 4 are one and the same line. It can be shown that the resonant effects on the tape 5** at the higher stepping speed can result in uneven spacing and even the loss of some of the signal pulses, as mentioned previously.

As shown in FIG. 3, clock pulses may be recorded in accordance with the invention on the tape 5 at a relatively slow stepping speed, as illustrated by the line 18. Write delay pulses are shown along line 27.

The clock pulses may be recorded on the tape 5 upon occurrence of the trailing edge 28 of each write delay pulses which occur in response to a step command pulse, as shown along line 29. The trailing edge 28 of each write delay pulses along line 27 occurs at points in time during each step of the tape 5 where optimum magnitude recording occurs (viz. the center of each bit increment or cell, when the tape has reached constant speed). These points are illustrated as points **35*a* through 35*f* along line 18 of FIG. 3. The slope of the curve is constant thereby showing constant tape speed. The points 35*a* through 35*f* along line 18 are projected horizontally onto the tape 5, which is a snap-shot of the tape 5 after pre-recording, to illustrate that the points 35*a* through 35*f* are evenly spaced and that clock pulses recorded at the point 35*a* through 35*f*** are also evenly spaced.

FIG. 4 illustrates the detrimental effects on the recording of the signal pulses on the tape 5 caused by the resonance of the incremental tape transport apparatus 10, at high stepping speeds, without the benefit of the invention. It can be seen that as the speed of the stepping motor 4 increases, the tape 5 moves in a more erratic manner as shown by the line **18*a* in FIG. 4. Thus, if signal pulses were recorded on the tape 5 after a slight delay by the write delay pulses in a manner previously described, the position of the recorded signal pulses on the tape would also be equally erratic and not equally spaced as shown by a projection of each of the recording points 35*a* through 35*k* on the tape 5. Accordingly, FIG. 4 illustrates the problem previously described, since the signal pulses may overlap during playback or, in fact, some of the signal pulses may be lost due to the erratic movement of the tape caused by the resonant effect of the incremental tape transport apparatus 10**.

In accordnace with the invention, the resonant effect on the tape 5, which causes the erratic movement, may be compensated for by the method which includes the steps of first pre-recording clock pulses on the tape 5 where the resonant effects are substantially eliminated or are minimal, as shown in FIG. 3. The clock pulses thus recorded on the tape are then utilized to enable the write amplifiers 21, and 31 through N1. Since the clock pulses enable the write amplifiers 21, and 31 through N1, the need for write delay pulses has been eliminated. Recording of the signal pulses in the other tracks on the tape is triggered at a given point on the tape where the clock pulses occur.

FIG. 2 illustrates the operation of the invention. The line 18*a* in FIG. 4, is shown, representing the erratic movement of the tape 5 due to the resonance of the incremental tape transport apparatus 10, as previously described in FIG. 4. Signal pulses are recorded on the tape 5 each time a timing or clock pulse occurs, thus the signal pulses and clock pulses occur at the same time and have the same uniform spacing as the timing or clock pulses.

In accordance with the invention, the signal pulses are recorded on the tape 5 in response to the enabling of the write amplifiers 21, and 31 through N1, instead of being delayed by delay pulses which are triggered by the step command pulses, as in the prior art. Thus, in accordance with the invention, the need for delay pulses is eliminated when signal pulses are recorded on the tape 5, and data is uniformlly recorded at stepping speeds in excess of stepping speed achieved by the prior art.

Information pulses may be read off the tape in a stepwise manner similar to that used to record on the tape, or the tape may be played back at a continuous speed normally used, for example, for computer playback. During normal playback, that is, when the tape is transported across the read/write units 1 through N continuously at a constant speed, the pre-recorded clock pulses need not be used so that only the information pulses may be amplified and utilized by such equipment as the computer. However, when the tape 5 is transported in a stepwise manner during playback, the pre-recorded clock pulses may be amplified and used for enabling AND gates corresponding to the read/write units 1 through N.

Referring to FIG. 1, playback of the tape in a stepwise manner may be accomplished, for example, by amplifiers 50 and 51 connected between read/write units 1 and 2 and an AND gate 52. The AND gate 52 is enabled in response to a clock pulse, so that a signal pulse from read/write unit 2 may pass through AND gate 52. Only one AND gate, namely AND gate 52, is illustrated in FIG. 1, however, it should be understood that an AND gate may be provided for each of the read/write units 2 through N and the read/write unit 1 in accordance with the invention.

From the foregoing description, it will be apparent that there has been provided an improved method of recording information in and reading information out of an interim signal storage medium which is driven in stepwise fashion by an incremental tape transport system. Accordingly, the foregoing description should be taken as illustrative and not in any limiting sense.

What is claimed is:

1. A method of recording information into an interim storage medium, which is driven incrementally, said method comprising the steps of (a) pre-recording clock pulses, each in a successive increment of said medium while said medium is driven at a low stepping speed, and (b) recording information pulses in each of said increments in synchronism with the pre-recorded clock pulse in said each increment while said tape is driven at a speed substantially higher than said low speed.

2. A method of recording information into and out of an interim storage medium, which is driven incrementally, said method comprising the steps of (a) pre-recording clock pulses, each in a successive increment of said medium while said medium is driven at a low stepping speed, (b) recording information pulses in each of said increments in synchronism with the pre-recorded clock pulse in said each increment while said tape is driven at a speed substantially higher than said low speed, and (c) reading said recorded information pulses in each of said increments in synchronism with said clock pulse in each of said increments while said tape is being driven at said higher speed.

3. A method of recording information into and out of an interim storage medium, which is driven incrementally, said method comprising the steps of (a) pre-recording clock pulses, each in a successive increment of said medium while said medium is driven at a low stepping speed, (b) recording information pulses in each of said increments in synchronism with the pre-recorded clock pulse in said each increment while said tape is driven at a speed substantially higher than said low speed, and (c) reading said recorded information pulses in each of said increments at a continuous speed.

4. A method of recording on magnetic tape in a step drive tape transport system, which moves said tape in a stepwise manner in response to step command pulses, said method comprising the steps of (a) delaying said step command pulses, (b) pre-recording said delayed step command pulses as clock pulses on said tape along one given track when said step delay pulses occur at a relatively slow rate such that said tape is driven at a relatively slow stepping speed, and (c) recording information pulses on a corresponding plurality of other tracks on said tape in synchronism with said pre-recorded clock pulses when said tape is driven at a higher stepping speed than said slow stepping speed.

5. A method of recording on magnetic tape in a step drive tape transport system which moves said tape in a stepwise manner in response to step drive pulses, said method comprising the steps of (a) generating clock pulses, each corresponding to a step drive pulse having a predetermined delay such that said clock pulses occur when said tape has accelerated to constant velocity after occurrence of its corresponding step drive pulses, (b) pre-recording clock pulses on said tape on a timing track at a relatively slow stepping speed where resonance effects are minimal, (c) recording of information pulses on at least one other track on said tape in synchronism with said clock pulses at a higher stepping speed than said slow stepping speed, and (d) reading out said recorded information pulses under control of said pre-recorded clock pulses and in synchronism therewith.

References Cited

UNITED STATES PATENTS

| | | | |
|---|---|---|---|
| 3,041,585 | 6/1962 | Wolfe | 340—174.1 |
| 3,099,822 | 7/1963 | Williams | 340—174.1 |
| 3,258,755 | 6/1966 | Guerth | 340—174.1 |
| 3,307,163 | 2/1967 | Rabinow | 340—174.1 |

TERRELL W. FEARS, Primary Examiner

V. P. CANNEY, Assistant Examiner